March 23, 1926.  
L. Y. SPEAR  
TRACTION VEHICLE  
Filed Sept. 2, 1922  
1,577,546  
8 Sheets-Sheet 1
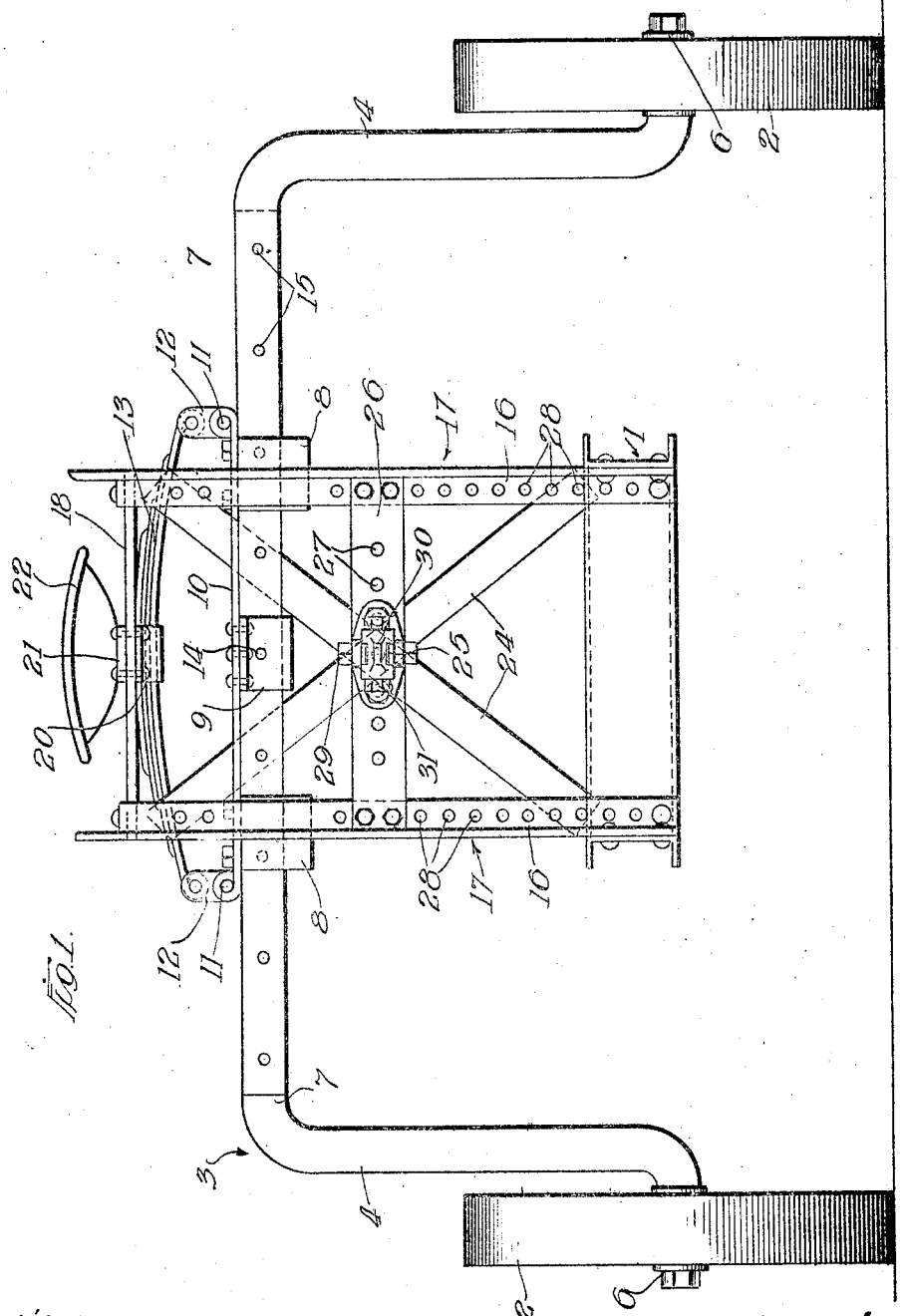

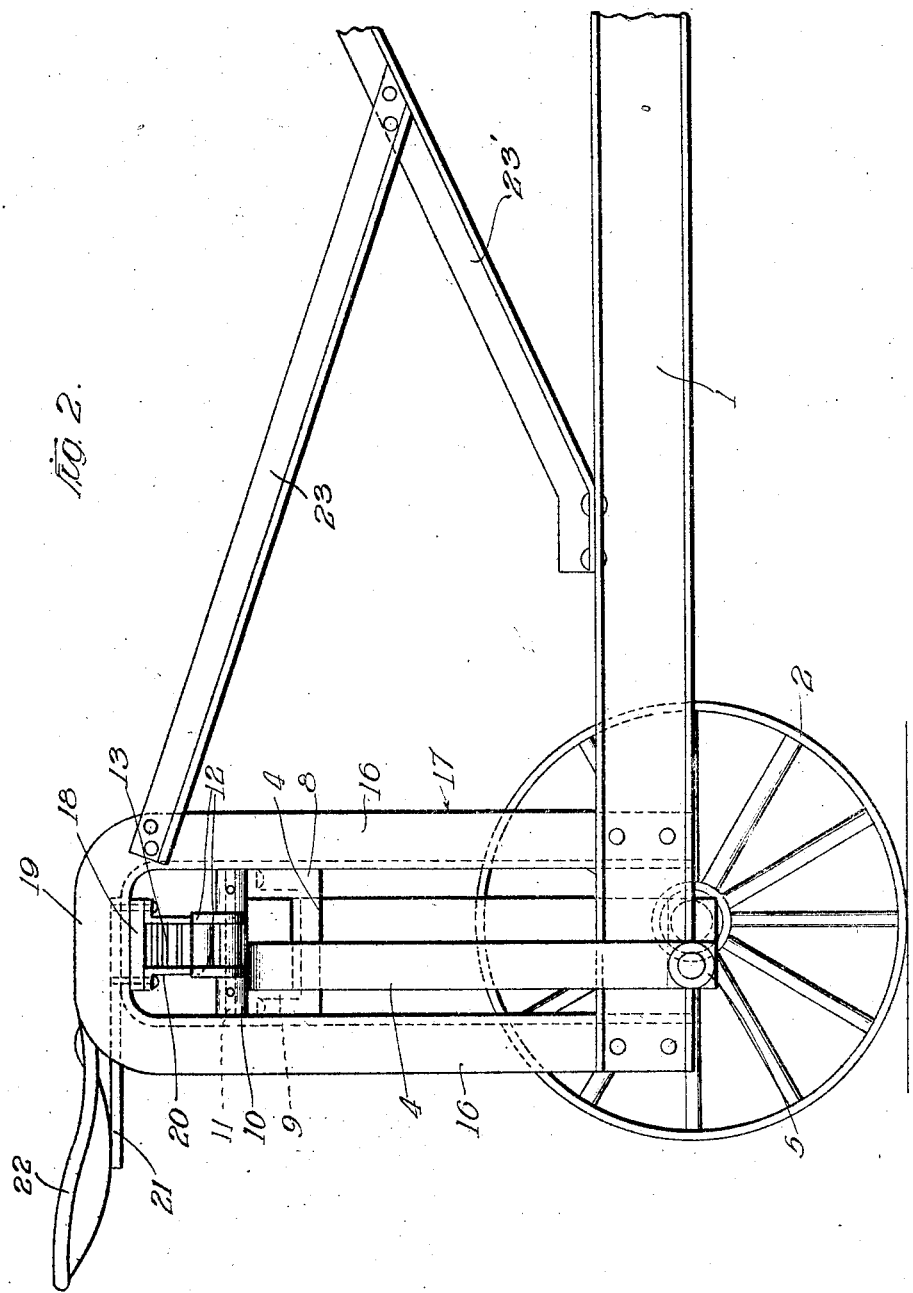

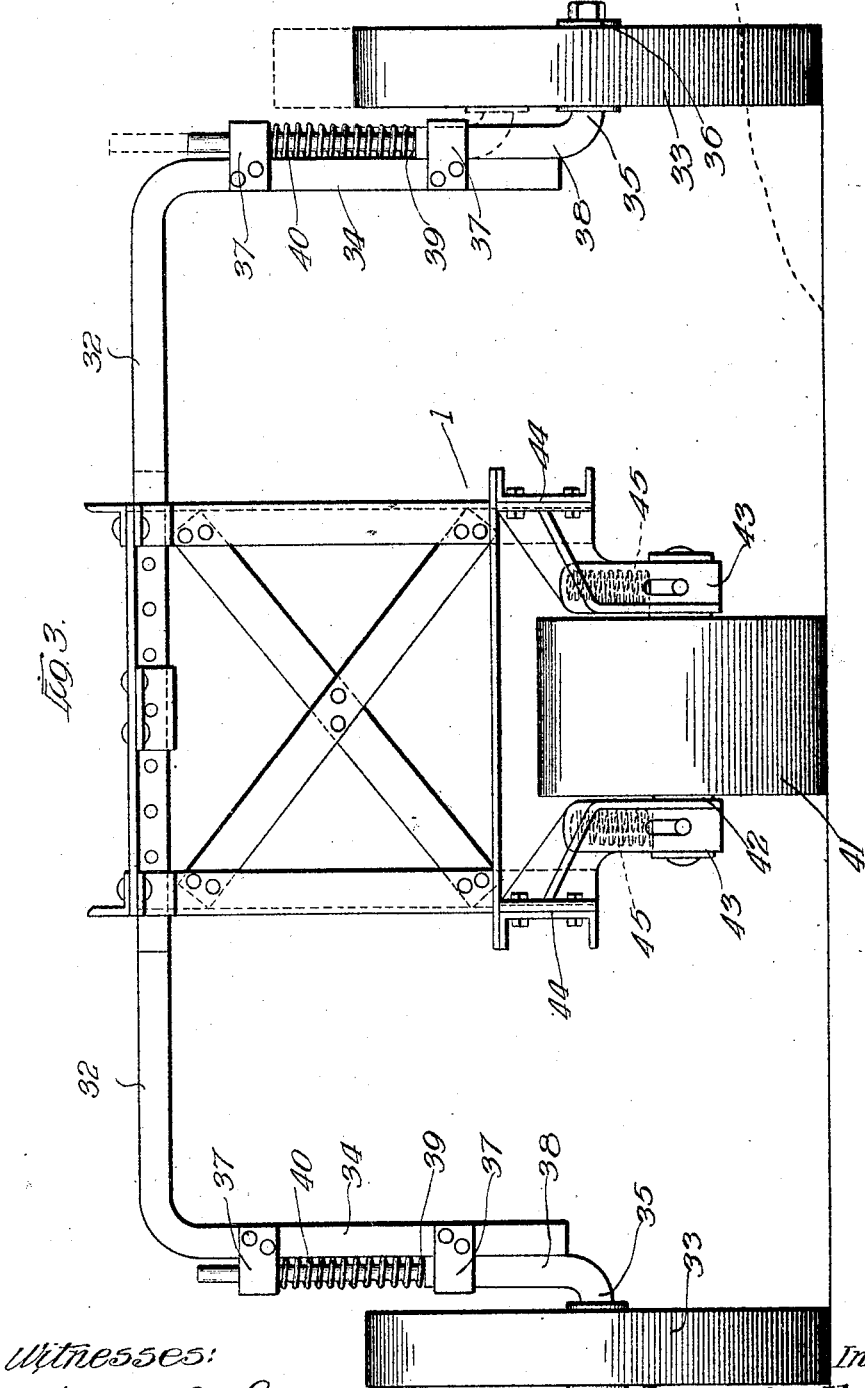

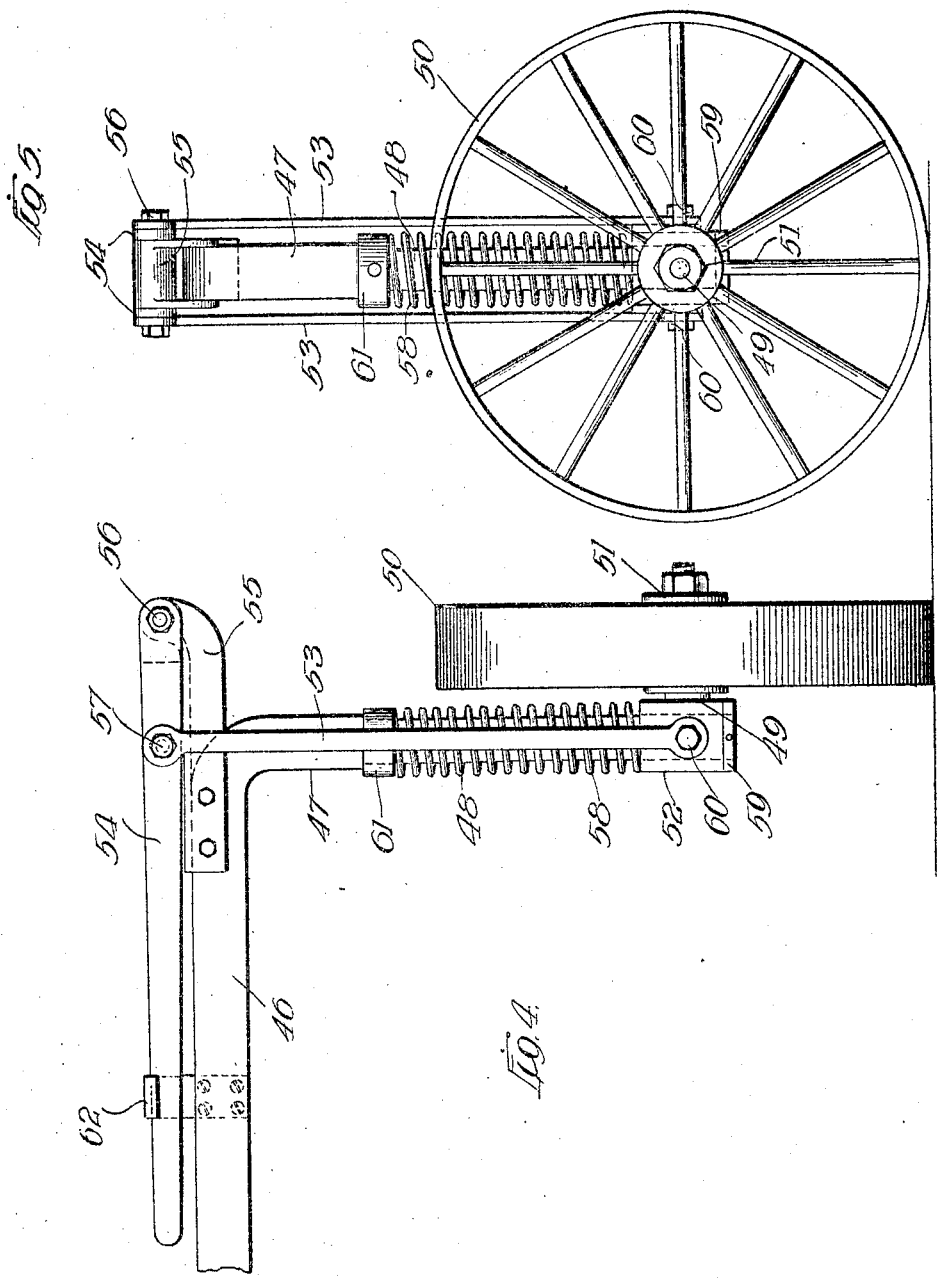

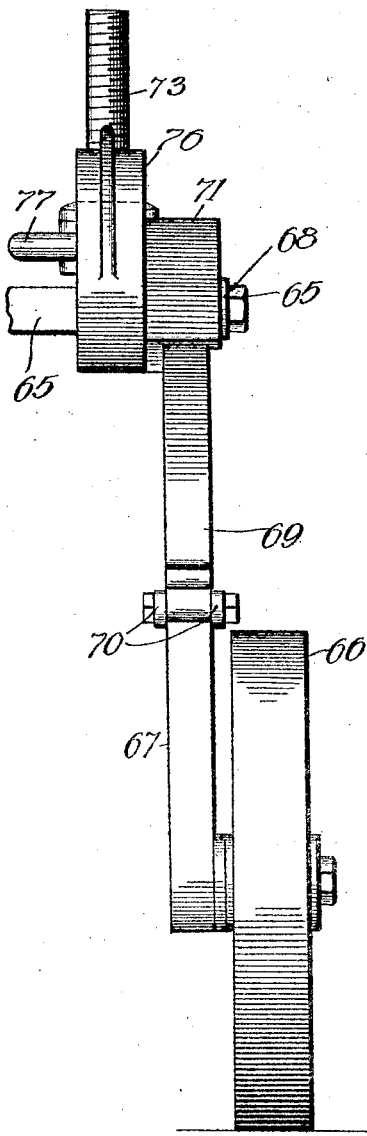
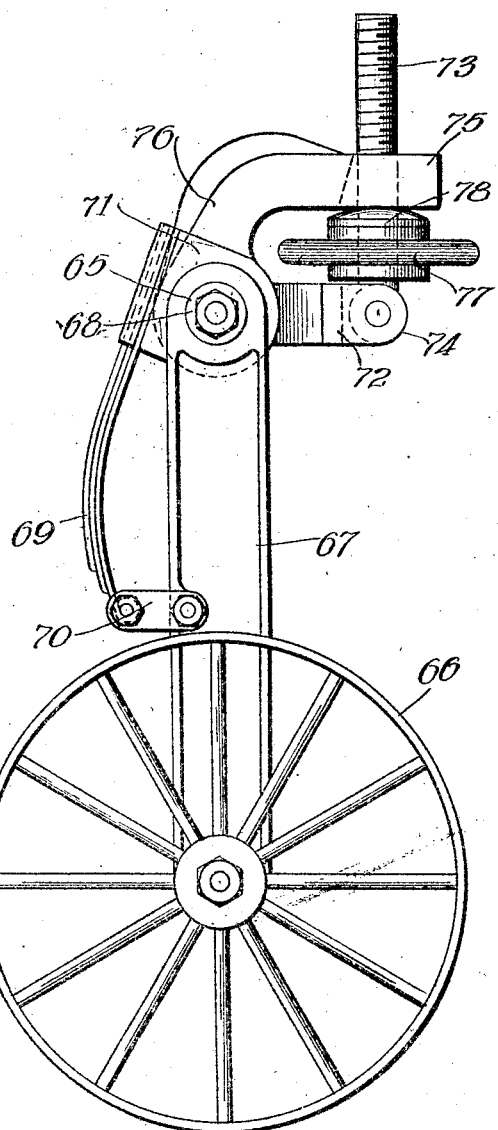

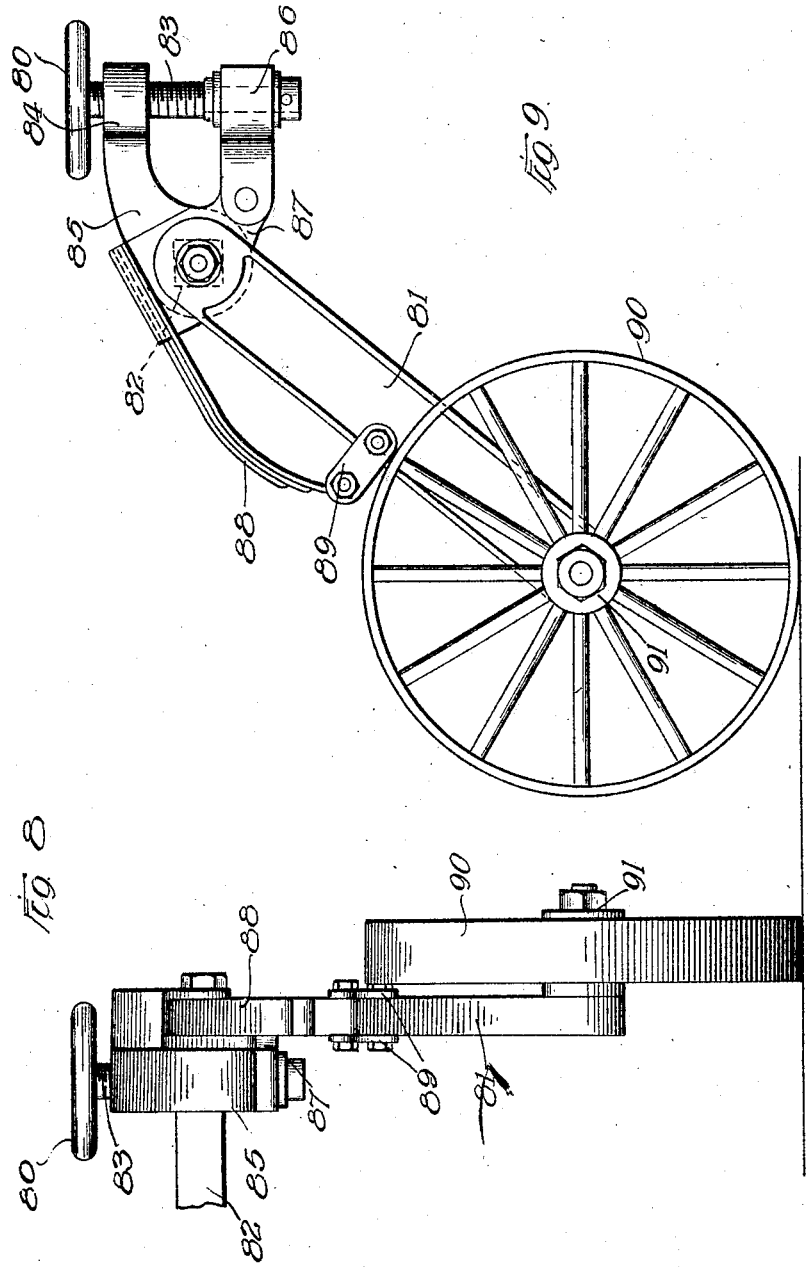

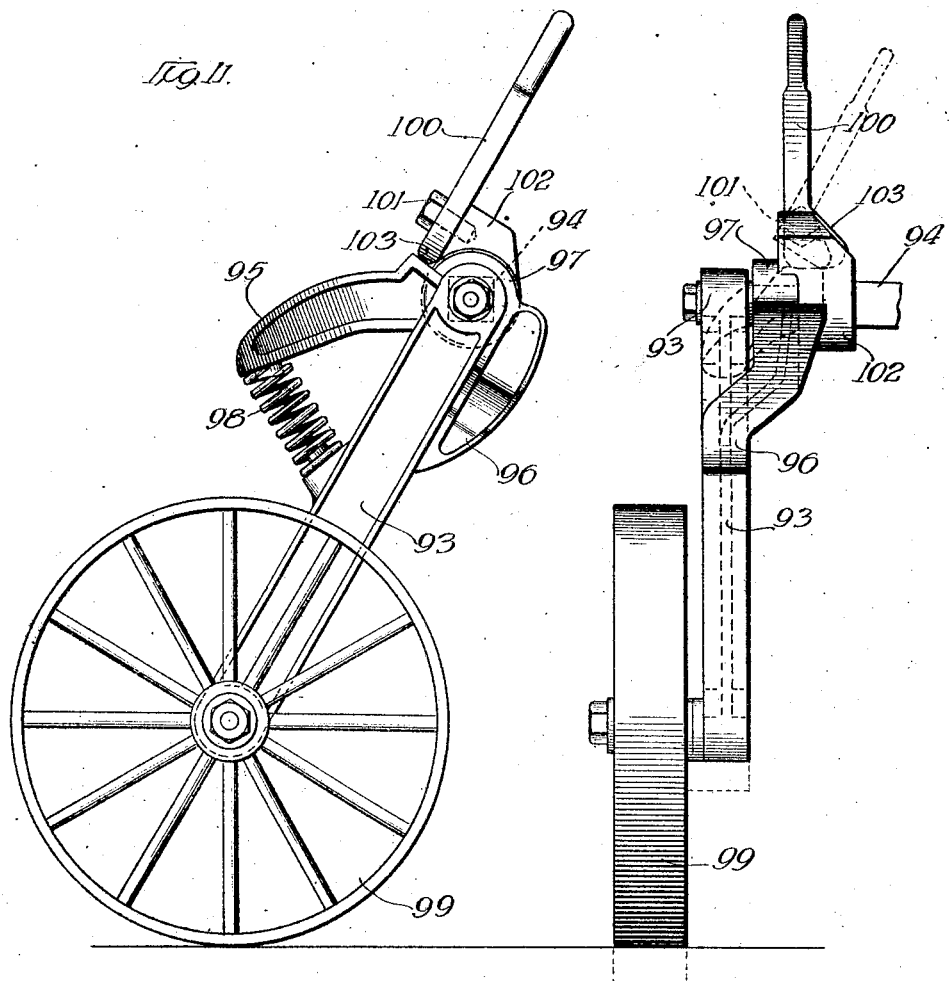

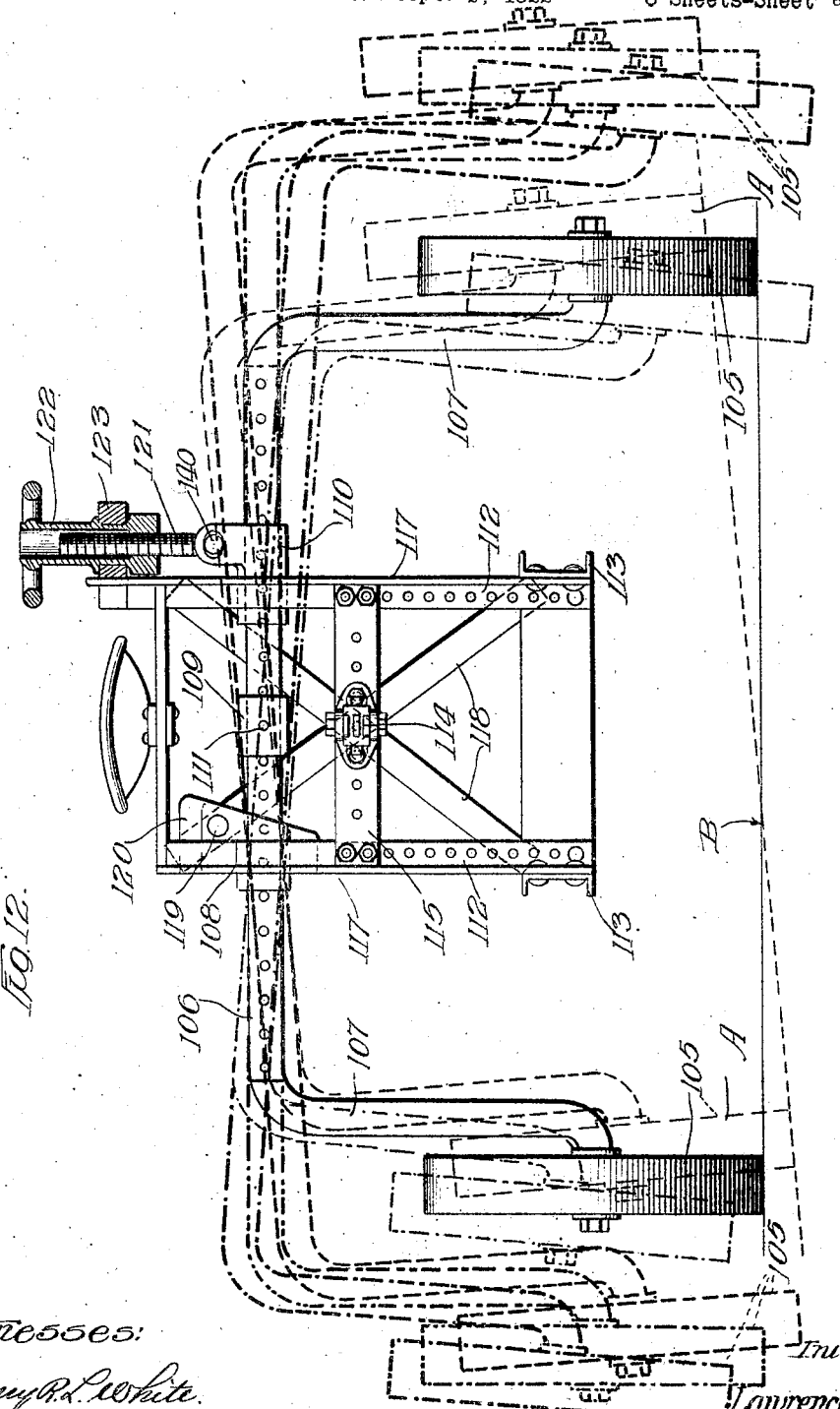

Patented Mar. 23, 1926.

1,577,546

UNITED STATES PATENT OFFICE.

LAWRENCE Y. SPEAR, OF NEW LONDON, CONNECTICUT.

TRACTION VEHICLE.

Application filed September 2, 1922. Serial No. 585,866.

*To all whom it may concern:*

Be it known that I, LAWRENCE Y. SPEAR, a citizen of the United States, residing at New London, in the county of New London and State of Connecticut, have invented a certain new and useful Improvement in Traction Vehicles, of which the following is a full, clear, concise, and exact description, reference being had to the accompanying drawings, forming a part of this specification.

My invention relates to traction vehicles, and is in general an improvement upon the invention set out in copending application, Serial Number 398,134, filed July 22nd, 1920, in the name of Gregory C. Davison.

One of the features of the invention set out in the above application consists in adapting the machine for the cultivation of growing crops and the like by the provision of a novel arched axle and relatively low narrow frame arrangement. The arched axle of such arrangement includes a pair of complete arches, one at each of the opposite sides of the vehicle for straddling the rows of growing crops and providing a relatively low intermediate horizontal portion for attachment to the relatively low frame of the vehicle.

My present invention aims to simplify and reduce the cost of construction and material of an axle of the general character set out in the above application.

A further aim of my present invention is the provision of a construction that will ride over inequalities in the surface of the ground, inclined surfaces and the like, with a minimum amount of movement of the body or frame of the vehicle in a vertical direction. To this end I have provided for mounting the wheels or axle of the vehicle as desired, in such manner that the wheels will be permitted to conform or adapt themselves to inequalities in the surface of the ground or inclined surfaces, with a minimum amount of movement of the vehicle body or frame in a vertical direction. I further provide adjustments in connection with the mounting of the wheel or the mounting of the axle as the case may be, by means of which the wheels may be adjusted to substantially the inclination of the surface over which the vehicle is to travel, to maintain the normal horizontal positioning of the body, and consequently the proper stability of the vehicle, as, for example, when working over the sides of a hill or the like. To allow for variations in the inclination of the surface to which such mounting is adjusted, I make such provisions that the mounting will give from its adjusted position to permit the wheels to readily conform or adapt themselves to such variations.

A still further aim of my present invention is the provision of means for effectively absorbing the road and other shocks and vibrations to which such vehicles are subjected.

Further aims of my invention and various novel constructional details and arrangements forming the subject matter of certain of the appended claims will be set out in detail in the following description.

In the accompanying drawings which show my improved axle arrangement at the rear;

Figure 1 is a rear elevational view of a vehicle embodying my invention, in which the mounting of the axle is yieldable so that the wheels may conform to inequalities or inclinations in the surface of the ground;

Figure 2 is a side elevational view of the same;

Figure 3 is a rear elevational view of a modification, in which the mounting of the wheels is such that they will conform to any such inequalities or inclinations;

Figure 4 is a rear elevational view of a modification in which the mounting of the wheels is such that they may be adapted to any inequalities or inclinations in the ground;

Figure 5 is a side elevational view of the same;

Figures 6, 8 and 10 are rear elevational views of modifications in which the mounting of the wheels is such that they may be adjusted to substantially the inclination of the surface over which the vehicle is to travel.

Figures 7, 9 and 11 are side elevational views of the modifications shown in Figures 6, 8 and 10; and Figure 12 is a rear elevational view of a still further modification in which the mounting of the axle is such that it may be adjusted to substantially the inclination of the surface over which the vehicle is to travel.

Referring first to Figures 1 and 2, the vehicle comprises a relatively low, narrow frame 1, preferably of the type more fully disclosed in the hereinbefore referred to co-pending application. The rear end of the frame 1 is supported by a pair of wheels 2—2 loosely mounted or journaled upon the opposite ends of the rear axle 3. This axle 3 comprises a pair of supplemental arch sections 4—4, preferably, although of course not necessarily, formed of square steel bars, the outer ends of each of which is turned down to form suitable spindles 5 for the reception of the wheels 2—2, which wheels may be held against axial displacement, as by means of suitable nuts and washers 6. Just inwardly beyond the wheel 2 mounted thereupon, each of the axle sections 4 is upturned to provide vertically extending portions, the upper ends of which terminate in laterally offset horizontally extending portions 7—7 slidably mounted in bearing blocks 8—8, and an intermediate bearing block 9 interposed therebetween.

These bearing blocks 8—8 and 9 are riveted, bolted, or otherwise secured to the under surface of a cross-plate 10, the opposite ends of which cross-plate 10 are notched and rolled back, as shown, to receive suitable pins 11, upon which pins 11 spring shackles 12 are mounted. The opposite ends of a leaf spring 13 are connected through the shackles 12 with the cross-plate 10. The intermediate bearing block 9 is provided with a locking pin receiving aperture 14, into register with which corresponding apertures 15 in the laterally offset horizontally extending portions 7—7 of the axle sections 4 are adapted to be moved. Various apertures in the axle sections 4—4 are adapted to register with one another and with the aperture 14 in the block 9 at various tread adjustments of the axle sections. Thus, by moving the horizontally extending portions 7—7 of the axle sections transversely through the supporting bearings 8—8 and 9, the tread of the wheels 2—2 may be adjusted as desired and then locked in adjusted position by inserting a bolt or other suitable locking pin through the registering apertures in the block 9 and axle sections 4—4.

The bearing blocks 8—8 are mounted for vertical sliding movement between the parallel vertical legs or upright portions 16 of a pair of draw bar frame members 17, one of which frame members 17 is mounted in upright position upon each of the opposite sides of the relatively low narrow frame 1. The leaf spring 13 likewise extends between the vertical legs or upright portions 16 of the frame member 17, and is confined vertically between the axle 3 and a cross-plate 18. The cross-plate 18 extends transversely between the upper horizontal portions 19 of the frame 17, and is secured at its opposite ends thereto. Yielding of the spring 13 thereby permits relative vertical movement between the axle 3 and the vehicle body or frame. Thus, a spring mounting of the vehicle is had, which spring mounting effectively absorbs such road and other shocks and vibrations as are developed, and at the same time permits sufficient tilting of the axle that the wheels 2—2 may adapt themselves to slight irregularities in or unevenness of the ground.

The transversely extending cross-plate 18 tying the upright draw bar frames 17 together forms a support at its center for a spring 21 secured thereto and extending rearwardly therefrom. The driver's seat 22 is mounted upon the rear free end of this spring 21. The leaf spring 13 is attached within its length to the cross-plate 18 by means of a suitable bracket member 20. The draw bar frame members 17 are braced in a transverse direction by suitable braces 24, extending diagonally therebetween and secured at their opposite ends thereto. Diagonally extending side braces 23 suitably secured at their rear ends to the forward vertical legs of the draw bar frame members 17 extend to and are secured at their opposite or forward ends to similar diagonal braces 23' secured to the longitudinal sill members of the frame 1, and extending to the forward portion (not shown) of the vehicle.

The universal hitch or draw bar arrangement provided in conjunction with the upright draw bar frame member 17 is more fully disclosed in co-pending application, Serial Number 398,950, filed July 26, 1920, in the name of Gregory C. Davison and Cecil P. Caulkins. Briefly, this draw bar arrangement or universal hitch comprises a yoke member 25 adjustably bolted to a draw bar plate 26 extending transversely between and adjustably secured at its opposite ends to the rear vertical legs 16 of the draw bar frame member 17. Horizontally aligned apertures 27 in the plate 26 provide for lateral or transverse adjustment of the yoke member 25 therealong. Vertically aligned apertures 28 provided in the rear vertical legs of the draw bar frame members 17 provide for vertical adjustment of the transversely extending plate 26 along these upright frame members. A coupling link pivotally mounted in the yoke member 25 upon a vertical pin 29 is in turn pivotally connected at its opposite end with a draft link 30 through a horizontal pin 31. Thus, a universal connection is effected with the draw bar plate 26, which universal connection may be adjusted transversely along the plate 26 or vertically with respect to the upright frame member 17, as desired.

While the spring connection between the vehicle framework and the axle 3 is highly desirable, a spacer block may be under certain conditions substituted for the spring 13 to provide a solid rigid connection between the axle and the framework of the vehicle. In other words, with the connection between axle and the frame rigid or non-yielding, as in the co-pending application, the present axle is in itself an improvement over the axle disclosed in such application, by reason of the fact that certain bends or turns in the axle are eliminated or avoided, and the cost of construction and material thereby reduced. Furthermore, this axle, in connection with the relatively low narrow frame shown, provides a novel and highly advantageous arrangement. A rigid non-yielding vertically adjustable mounting of such an axle is contemplated.

In Figure 3 I have illustrated a modified form of my invention, in which the mountings of the wheels are yieldable with respect to the axle of the vehicle, so that they may conform to any inequalities or inclinations in the surface of the ground. In this form, the axle comprises a pair of arch sections 32 adjustable transversely through their supporting brackets to vary the tread of the wheels 33 in substantially the same manner as outlined in connection with Figures 1 and 2. The vertically depending portions 34 of these arch sections terminate at the lower ends of the vertical portions instead of being outturned to receive the wheels 33. The wheel carrying spindles 35 upon which the wheels 33 are mounted and secured against displacement as by means of suitable co-operating nuts and washers 36 are turned up and extend along the vertically depending portions 34 of the arch sections 32 through bracket members 37 carried thereby. The upper ends of the upwardly extending portions 38 of these wheel carrying members are reduced as shown at 39 to provide suitable shoulders, between which shoulders and the upper bracket members 37 coil springs 40 about the reduced portions of the wheel carrying members are confined.

The springs 40 thereby provide a yieldable or spring connection between the wheels 33 and the axle of the vehicle for absorbing any shocks or vibrations to which the vehicle may be subjected. In case one of the wheels strikes an obstruction or an uneven place in the field, the upwardly extending portion of the spindle carrying such wheel will slide upwardly through the bracket members 37 against the tension of the coiled spring 40, thereby permitting the wheel to accommodate itself to the obstruction or uneven surface (see dotted line position) without materially tilting the frame of the vehicle from its normal horizontal position.

The major portion of the weight of the rear end of the vehicle is supported by a relatively wide wheel 41. This relatively wide supporting wheel 41 is mounted upon an axle 42, the opposite ends of which axle are mounted or journaled in bearings 43. The bearings 43 are in the form of bracket members, bolted or otherwise suitably attached to and depending from the longitudinal frame or sill members 44 of the frame 1 of the vehicle. Compression springs 45 provided within the bracket members 43 between the axle bearings and the main bearings effect a spring or floating mounting of the load upon the wheel 41, permitting relative vertical movement between the wheel and the frame, whereby shocks or vibrations developed are absorbed, and a certain yielding to the surface over which the vehicle is travelling is had. In that the major weight of the tractor is supported by the wheel 41, the outer wheels 36 serve more as a guide for controlling the roll of and stabilizing the tractor.

In the arrangement shown in Figures 4 and 5, the wheels are adapted to the ground by relative vertical movement between the wheels and the axle, as in Figure 3. The axle preferably includes a pair of transversely adjustable sections, although, of course, it may be formed in one piece, or otherwise, as desired. In this case the lower end of the outer vertically depending portions 47 of the axle 46 is reduced as shown at 48. A wheel carrying spindle or stud 49 upon which the wheel 50 is mounted and secured against displacement as by means of a suitable co-operating nut and washer 51 projects from a block or sleeve 52, which block or sleeve 52 is slidably mounted upon this lower reduced vertically depending portion 48 of the axle.

A pair of rods or arms 53 pivotally connected at 60 with the opposite sides of the vertically slidable block 52 extend up and are pivotally connected through bolts or other suitable pivot pins 57 at their opposite ends with a pivoted hand lever 54, by means of which lever the block 52, and consequently the wheel 50 may be raised or lowered, as desired. A collar 59 pinned or otherwise fixed upon the lower end of the vertically depending reduced portion 48 of the axle limits the downward movement of the block 52, therealong. The outer end of the operating lever 54 is forked or bifurcated for the reception of the upturned end of a fixed bracket member 55, which bracket member is bolted or otherwise attached to the horizontally extending portion of the axle 46, and projects therefrom. A bolt 56, or other suitable pivot pin extends through the forked end of the lever 54 and the upturned end of the bracket member 55, and thereby effects a pivotal mounting of the swinging lever 54.

In working on the side of a hill or on an uneven surface with this arrangement, either of the wheels may be raised or lowered by swinging the lever 54 associated therewith about its pivot 56 to move the block 52 upwardly or downwardly along the vertical portion of the axle as desired. In this manner the wheel on the highest inclination or on the obstruction—as the case may be—is adjusted, so that the vehicle can work over such surface without materially tilting the frame or body thereof. Tilting of the vehicle frame not only decreases the stability of the vehicle, but is undesirable for various other reasons. With the arrangement above outlined, proper stability of the vehicle may be assured at all times.

A coiled spring 58 surrounds the reduced vertically depending portion 48 of the axle 46, and is confined between the wheel carrying block 52 and a shoulder in the form of a collar or sleeve 61 pinned or otherwise fixed upon the vertically depending portion of the axle at the upper end of the reduced portion thereof. The hooked or looped portion of a strap or plate 62 secured to the horizontally extending portion of the axle 46 is adapted to receive the free end of the lever 54 as shown, to restrain such lever against pivotal movement about its pivot 56, thereby locking the wheel carrying block 52 against appreciable vertical movement relative the axle 46. By releasing the lever 54 from the hook 62, vertical movement of the block 52 relative the axle 46, and consequently vertical adjustment of the wheel 50 may be had. The spring 58 cushions such relative movement between the wheel and the axle or frame of the vehicle, and in addition prevents an undesirable drop of the frame at such point. Furthermore, when the lever 54 is released, any vibrations or shocks developed are absorbed by the spring 58, which spring also assists the operator in lowering the wheel after it has once been raised.

In Figures 6 and 7 I have shown an arrangement wherein adjustment of the wheels to the desired vertical position is had by swinging or pivoting them about the axle of the vehicle. In this arrangement, each of the wheels 66 associated with the axle 65 is carried by an arm 67, one of which arms 67 is rigidly mounted at its upper end upon a turned down portion adjacent the outer end of the axle. Displacement of the arms 67 from the ends of the axle 65 is prevented as by means of suitable co-operating nuts and washers 68. The arms 67 are thereby adapted to be swung or oscillated about the axis of the axle 65 without slipping off the ends thereof.

The wheel 66 is yieldably held in working engagement with the surface over which the vehicle is travelling, by means of a leaf spring 69, the lower end of which spring is connected or tied to the wheel carrying arm 67 through a suitable shackle 70. The opposite or upper end of the spring 69 is mounted site or upper end of the spring 69 is mounted in or carried by an arm 71, which arm 71 is mounted for rotation about the turned down portion of the axle 65. The forward end of the arm 71 is forked or provided with a yoke 72, for the reception of the lower end of an adjusting screw 73 secured in the yoke 72 by a pin 74 extending transversely through the adjusting screw and the forked end of the arm 71. The threaded shank of the adjusting screw 73 extends up through the overhanging portion 75 of an arm 76, which arm 76 is mounted upon the square portion of the axle 65 or is otherwise fixed angularly relative the axle. A hand wheel 77 and co-operating washer 78 on the shank of the adjusting screw 73 between the forked end 72 of the rotatable arm 71 and overhanging portion 75 of the fixed arm 76 provides for rotating the wheel carrying arm 67 and the wheel 66 about the axis of the axle 65. Such rotation or pivotal movement of the arm 67 about the axle 65 is had by rotating the hand-wheel 77 to thread the screw 73 either upwardly or downwardly therethrough, depending upon the direction of rotation of the arm 67 desired.

It will be apparent that clockwise rotation of the arm 67 about the axle 65 will raise the wheel 66 vertically, while counter-clockwise rotation of such arm 67 will lower the wheel vertically. Consequently, the wheel 66 may be raised or lowered to any desired vertical position by means of the hand-wheel 77 associated therewith. Thus, upon riding over inequalities in the surface of the ground, or inclined surfaces, either of the wheels may be readily adjusted so that the frame of the vehicle will not be materially disturbed in a vertical direction. This arrangement is particularly advantageous when working on side hills, or when it is otherwise desired to adjust the wheels to substantially the inclination of the surface over which the vehicle is to travel. The yielding angular connection between the wheels and the axle provided by the spring 69 permits the wheel to give with any variation in the particular inclination to which it is adjusted. I propose to use one of these arrangements in connection with each of the adjustable wheels, so that they can be adjusted separately. Any shocks or vibrations developed are absorbed by the springs 69.

The arrangement shown in Figures 8 and 9 is substantially the same as that shown in Figures 7 and 8, with the exception that the hand-wheel 80 for swinging the wheel carrying arm 81 about the axle 82 is mounted upon the shank of the adjusting screw 83 above the overhanging portion 84 of the fixed arm 85, instead of between such overhanging portion and the forked end 86 of the rotatable arm 87. As before, the leaf spring 88 carried by the arm 87 is connected or tied at one end through a shackle 89 with the wheel carrying arm 81. The wheel 90 is secured against displacement by means of a suitable co-operating nut and washer 91.

In Figures 10 and 11, I have shown still another arrangement for adjusting or swinging the wheels about the axle in order to obtain the desired raising or lowering of the wheel. In this form the depending wheel carrying arm 93 is again loosely mounted adjacent its upper end upon a turned down portion of the axle 94. The wheel carrying arm 93 is rotatable about the axle 94 between the jaws 95 and 96, respectively, of a jaw carrying member 97, mounted for rotation about the turned down portion of the axle 94. A coiled spring 98 interposed between the jaw 95 and the wheel carrying arm 93 limits the clockwise rotation of the arm 93 about the axle 94, and yieldably holds the wheel 99 in working engagement with the surface over which the vehicle is travelling or working. The jaw 96 limits counter-clockwise rotation of the arm 93 about the axle 94.

The wheel carrying arm 93 is swung or rotated about the axle 94 by means of a hand lever 100 pivotally secured through a bolt or stud 101 to a block 102 fixed upon the axle 94 against rotation relative thereto. The lower end of the lever 100 is provided with a cam surface or edge 103, so that upon swinging the lever 100 about its pivot 101, the jaw carrying member 97 will be cammed about the axle 94, and the arm 93 and wheel 99 carried thereby will be swung about the axle through the spring 98 to secure a lower vertical positioning of the wheel. With the particular arrangement shown, there are only two positions of the wheel 99, namely, the maximum adjustable shown in dotted lines, and the normal position shown in full lines. However, the cam at the lower end of the lever 100 may be formed so that various intermediate adjustments may be had. Shocks and vibrations developed are absorbed by the springs 98, which springs yieldably hold the wheels in adjusted position.

In Figure 12 I have shown an arrangement in which the mounting of the axle itself is such that it may be tilted or adjusted to substantially the inclination of the surface of the ground over which the vehicle is to travel. In this arrangement, the wheels 105 are, as in the form shown in Figures 1 and 2, fixed relative the axle 106, which axle 106 is pivotally connected with the vehicle body or frame so that it may be tilted or swung angularly as a unit with the wheels 105 through a vertical plane with respect to the frame of the vehicle. This axle 106, like the others, may include two similar axle sections 107, adjustable transversely through supporting bearings in the form of bearing blocks 108, 109 and 110. The block 109 is provided with a locking pin receiving aperture 111, into register with which corresponding apertures in the horizontal portions of the axle sections 107 are adapted to be moved, and a suitable pin or bolt then inserted to lock the axle sections, and thereby the wheel tread, in adjusted position. The supporting blocks 108 and 110, as before, are arranged for vertical sliding movement between the parallel vertical legs or upright portions 112 of the draw bar frame members 117, one of which frame members is mounted in upright position upon each of the opposite sides of the frame 113 of the vehicle.

As before, the draw bar hitch 114 is adjustably attached to a draw bar plate 115, which draw bar plate 115 is in turn adjustably attached at its opposite ends to the upright portions or vertical legs 112 of the draw bar frames 117. The draw bar frames are braced transversely with respect to the vehicle by braces 118 extending diagonally therebetween.

The axle supporting bearing 108 is pivotally secured at 119 to a block or casting 120 carried by the draw bar frame 117 at the left hand side of the vehicle. The axle supporting bearing 110 is held in place between the vertical legs 112 of the right hand draw bar frame 117 by means of a screw 121, the lower end of which screw 121 is connected through a pin and slot connection 140 with the bearing block 110. The screw 121 threads up through a hand wheel 122, the depending internally threaded hub or sleeve portion of which is fixedly mounted in a bracket 123 attached to the upwardly projecting portion of the right hand draw bar frame 117.

It will now be apparent that by rotating the hand wheel 122 the screw 121 will be threaded upwardly into or downwardly therefrom, and the entire axle 106 with the wheels 105 at its opposite ends swung in a clockwise or counter-clockwise direction about the pivotal mounting 119 as desired. The full line position of the axle shows the axis of rotation of the wheels 109 in its normal horizontal position. Dotted lines A—A show the positioning of the wheels 105 (the transverse or thread adjustment remaining the same) upon swinging the axle 106 in a counter-clockwise direction about its pivot 119 sufficiently to adapt the wheels to the inclined surface B. The other dotted line positions show just a few of the various other adjustments which may be had with this arrangement. Suitable mounting springs may be provided between the wheels and the axle, or between the axle and the frame or body of the vehicle, if so desired.

While I have described my invention in connection with the details of particular embodiments, I do not intend thereby to limit the invention to such details, as I am aware and contemplate that other modifications and changes may be made without departing from the invention which is set out in the appended claims. For example, the adjustment of a traction or driving wheel is contemplated within the scope of the present invention.

I claim:

1. In combination, a relatively low narrow vehicle or chassis frame, a pair of upright axle carrying frames extending therefrom, a cross plate between said axle carrying frames, a seat carried by said cross plate, a spring carried by said cross plate, and an axle comprising vertically depending wheel carrying portions joined by a horizontally extending portion carried by said spring and mounted for vertical movement in the axle carrying frame, said spring absorbing any shocks or vibrations developed and permitting movement of the wheels relative the frame so that they may adapt themselves to irregularities or inclinations in the surface over which the vehicle is traveling.

2. In a machine of the class described, a chassis frame, an axle frame, said axle frame having substantially parallel vertical legs, an axle carrying member slidably mounted in and guided vertically between the legs of the axle frame, an axle carried by said member, and means cushioning movement of the axle.

3. In a machine of the class described, a chassis frame, an axle frame, said axle frame having substantially parallel vertical legs, an axle carrying member guided between the legs of the axle frame, an axle carried by said member, said axle comprising a pair of axle sections adjustable in the axle carrying member transversely of the chassis frame, and means cushioning movement of the axle.

4. In a machine of the class described, a relatively low narrow vehicle frame, substantially U-shaped frames mounted in upright inverted position at opposite sides of the vehicle frame, a cross member between said last frames, axle carrying blocks mounted for vehicle movement in said U-shaped frame, an axle comprising a pair of axle sections adjustable in said blocks transversely of the chassis frame, and a cantilever spring shackled at its opposite ends and interposed between the cross member and the axle to cushion vertical movement of same.

5. In a machine of the class described, a vehicle frame, substantially U-shaped frames mounted in upright inverted position at opposite sides of the vehicle frame and having substantially parallel vertical legs, a cross member extending between said U-shaped frames and secured at its opposite ends thereto, a second cross member extending transversely of the vehicle frame and between the vertical legs of said U-shaped frames and movable vertically therebetween, a spring of the cantilever type attached to said first cross member and shackled at opposite ends to said second cross member, guide blocks carried by said second cross member and movable vertically between the vertical legs of the U-shaped frames, an axle comprising a pair of axle sections adjustable in said blocks transversely of the chassis frame and means for locking the axle sections in adjusted positions.

6. In a machine of the class described, a chassis frame, an axle frame, said axle frame having substantially parallel vertical legs, an axle carrying member guided between the legs of the axle frame, an axle carried by said member, said axle comprising a pair of axle sections adjustable in the axle carrying member transversely of the chassis frame, wheels on the axle sections, and means cushioning movement of said wheels.

7. In a machine of the class described, the combination of a chassis frame, an axle frame, an axle carrying member slidably mounted on and guided vertically by said axle frame, an axle comprising a pair of axle sections adjustable in the axle carrying member transversely of the chassis frame, wheels on the axle section, and means cushioning movement of said wheels.

8. In a machine of the class described, the combination of a chassis frame, a pair of axle guides thereon, an axle carrying member slidably mounted on each said guides, an axle comprising a pair of axle sections adjustable transversely of the chassis frame in both said axle carrying members, and a ground wheel on each said axle sections.

9. In a machine of the class described, the combination of a chassis frame, a pair of axle guides thereon, an axle carrying member slidably mounted on each said guides, an axle comprising a pair of axle sections adjustable transversely of the chassis frame in both said axle carrying members, an intermediate axle bearing member for said axle sections between said axle carrying members, and means cooperable with the axle sections and with said intermediate axle bearing member for locking the axle sections in adjusted position.

10. In a machine of the class described, the combination of a relatively low chassis frame, an axle frame mounted upon and extending upwardly from each of the opposite sides of said chassis frame, a cross member at the upper ends of said axle frames, an axle carrying member slidably mounted in each said axle frames, an axle comprising a pair of axle sections adjustable transversely of the chassis frame in said axle carrying members, wheels on said axle sections, and a spring interposed between the axle sections and said cross member for cushioning said wheels.

In witness whereof, I hereunto subscribe my name this 25th day of August, 1922.

L. Y. SPEAR.